US009045604B2

(12) United States Patent
Chen et al.

(10) Patent No.: US 9,045,604 B2
(45) Date of Patent: Jun. 2, 2015

(54) POLYESTER COMPOSITION, AND POLYESTER ARTICLE PREPARED THEREFROM

(71) Applicant: INDUSTRIAL TECHNOLOGY RESEARCH INSTITUTE, Hsinchu (TW)

(72) Inventors: Meng-Hsin Chen, Xinpi Township (TW); Chih-Hsiang Lin, Taipei (TW); Chung-Cheng Lin, Kaohsiung (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/224,162

(22) Filed: Mar. 25, 2014

(65) Prior Publication Data

US 2014/0378623 A1   Dec. 25, 2014

(30) Foreign Application Priority Data

Jun. 25, 2013   (TW) .............................. 102122475 A

(51) Int. Cl.
  C08G 63/02   (2006.01)
  C08J 5/18    (2006.01)
  C08G 63/91   (2006.01)
  C08G 64/00   (2006.01)

(52) U.S. Cl.
  CPC .................. C08J 5/18 (2013.01); C08G 63/916 (2013.01); C08J 2367/03 (2013.01)

(58) Field of Classification Search
  CPC .. C07D 201/00; C07D 303/18; C08J 2367/03
  USPC ............... 428/411.1, 412; 502/152, 155, 156; 525/408; 528/92, 102, 105, 152, 155, 528/176, 190, 192, 193, 194, 416
  See application file for complete search history.

(56) References Cited

U.S. PATENT DOCUMENTS

| 2005/0113556 A1 | 5/2005 | Strand et al. |
| 2005/0176884 A1 | 8/2005 | Lee et al. |
| 2007/0015881 A1 | 1/2007 | Hale |
| 2007/0037958 A1 | 2/2007 | Kannan et al. |
| 2008/0124644 A1 | 5/2008 | Liu et al. |
| 2008/0171212 A1 | 7/2008 | Shedlosky et al. |
| 2010/0256261 A1 | 10/2010 | Kliesch et al. |
| 2011/0305913 A1 | 12/2011 | Hinton et al. |
| 2013/0225788 A1* | 8/2013 | Meegan ........................ 528/408 |

FOREIGN PATENT DOCUMENTS

| CN | 101469108 A | 7/2009 |
| CN | 101654546 A | 2/2010 |
| CN | 101759961 A | 6/2010 |
| JP | 2009-294476 A | 12/2009 |
| JP | 2010-032564 A | 2/2010 |
| JP | 2012-122051 A | 6/2012 |
| WO | WO 2007/008365 A1 | 1/2007 |
| WO | WO 2011/030098 A1 | 3/2011 |

OTHER PUBLICATIONS

Kawakami et al., "Deformation-Induced Phase Transition and Superstructure Formation in Poly(ethylene terephthalate)", Macromolecules, vol. 38, pp. 91-103, 2005.
Kawakami et al., "New Insights into Lamellar Structure Development and SAXS/WAXD Sequence Appearance during Uniaxial Stretching of Amorphous Poly(ethylene terephthalate) above Glass Transition Temperature", Macromolecules, vol. 41, pp. 2859-2867, 2008.
Kawakami et al., "Superstructure Evolution in Poly(ethylene terephthalate) during Uniaxial Deformation above Glass Transition Temperature", Macromolecules, vol. 39, pp. 2909-2920, 2006.
MacDonald et al., "Latest advances in substrates for flexible electronics", Journal of the SID 15/12, pp. 1075-1083, 2007.
Rao et al., "The relationship between microstructure and toughness of biaxially oriented semicrystalline polyester films", Polymer 49, pp. 2507-2514, 2008.

\* cited by examiner

*Primary Examiner* — Terressa Boykin
(74) *Attorney, Agent, or Firm* — Birch, Stewart, Kolasch & Birch, LLP

(57) ABSTRACT

The disclosure provides a polyester composition and a polyester article. According to an embodiment, the polyester composition includes a polyester and a branched monomer. The branched monomer has a structure represented by formula (I) or formula (II):

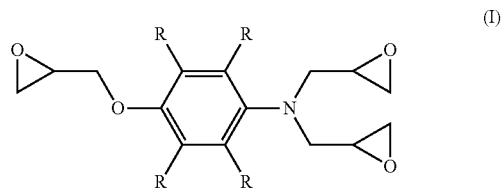

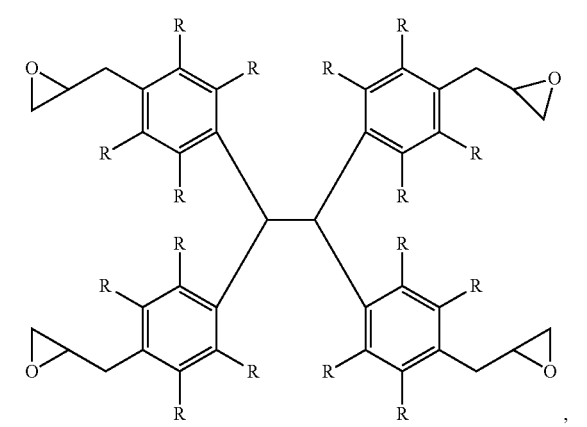

wherein R is independently hydrogen, fluorine, chlorine, bromine, or $C_{1-6}$ alkyl.

12 Claims, 7 Drawing Sheets

POLYESTER COMPOSITION, AND POLYESTER ARTICLE PREPARED THEREFROM

CROSS REFERENCE TO RELATED APPLICATION

The present application is based on, and claims priority from, Taiwan Application Serial Number 102122475, filed on Jun. 25, 2013, the disclosure of which is hereby incorporated by reference herein in its entirety.

TECHNICAL FIELD

The technical field relates to a polyester composition and an article prepared therefrom.

BACKGROUND

Polyester films can be used in a variety of applications. In order to be suitable for various applications, the polyester materials should have corresponding functional requirements. For example, an upper layer and a lower layer of the back-sheet of a solar cell module are DuPont's Tedlar films, and a middle layer between the upper layer and the lower layer is a polyester film. Since solar cells are often in a humid and warm environment, materials used in solar cells should meet the weathering resistance requirements. Therefore, a polyester film of the back-sheet used in a solar cell has to exhibit a high weathering resistance (e.g. thermal resistance and hydrolysis resistance).

Accordingly, a polyester film with both good thermal resistance and hydrolysis resistance is still called for.

SUMMARY

One embodiment of the disclosure provides a polyester composition includes a polyester and a branched monomer, wherein the branched monomer has a structure represented by formula (I) or formula (II):

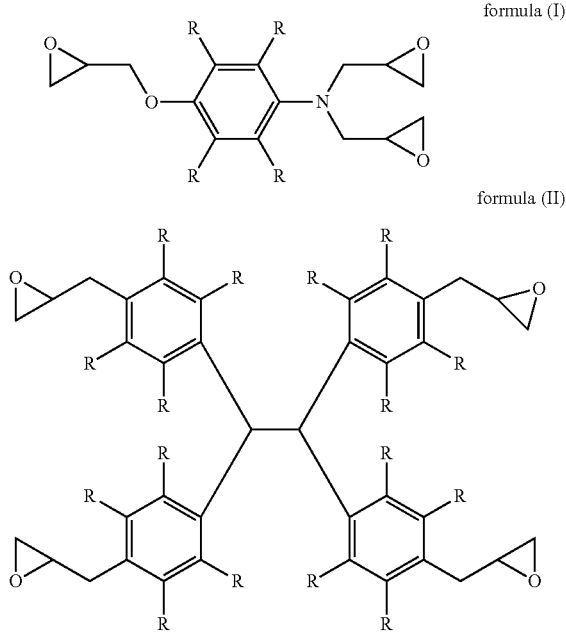

wherein, R is independently hydrogen, fluorine, chlorine, bromine, or $C_{1-6}$ alkyl.

One embodiment of the disclosure provides a polyester article including a product made by polymerizing the aforementioned composition.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
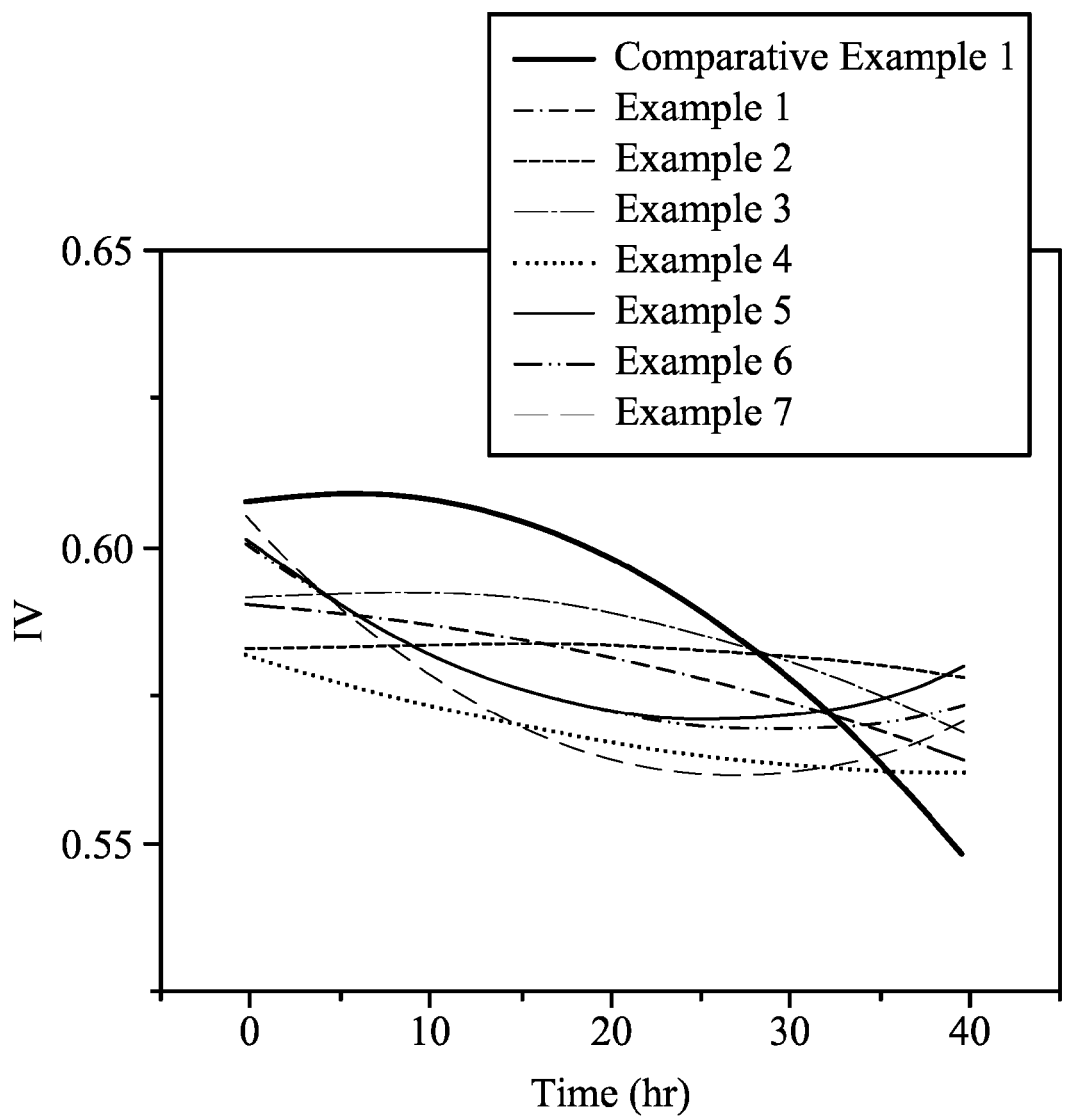
FIG. 1 is a graph plotting the hydrolysis resistances of modified polyester pellets disclosed in Examples 1-7 and Comparative Example 1 of the disclosure.
Figure 2:
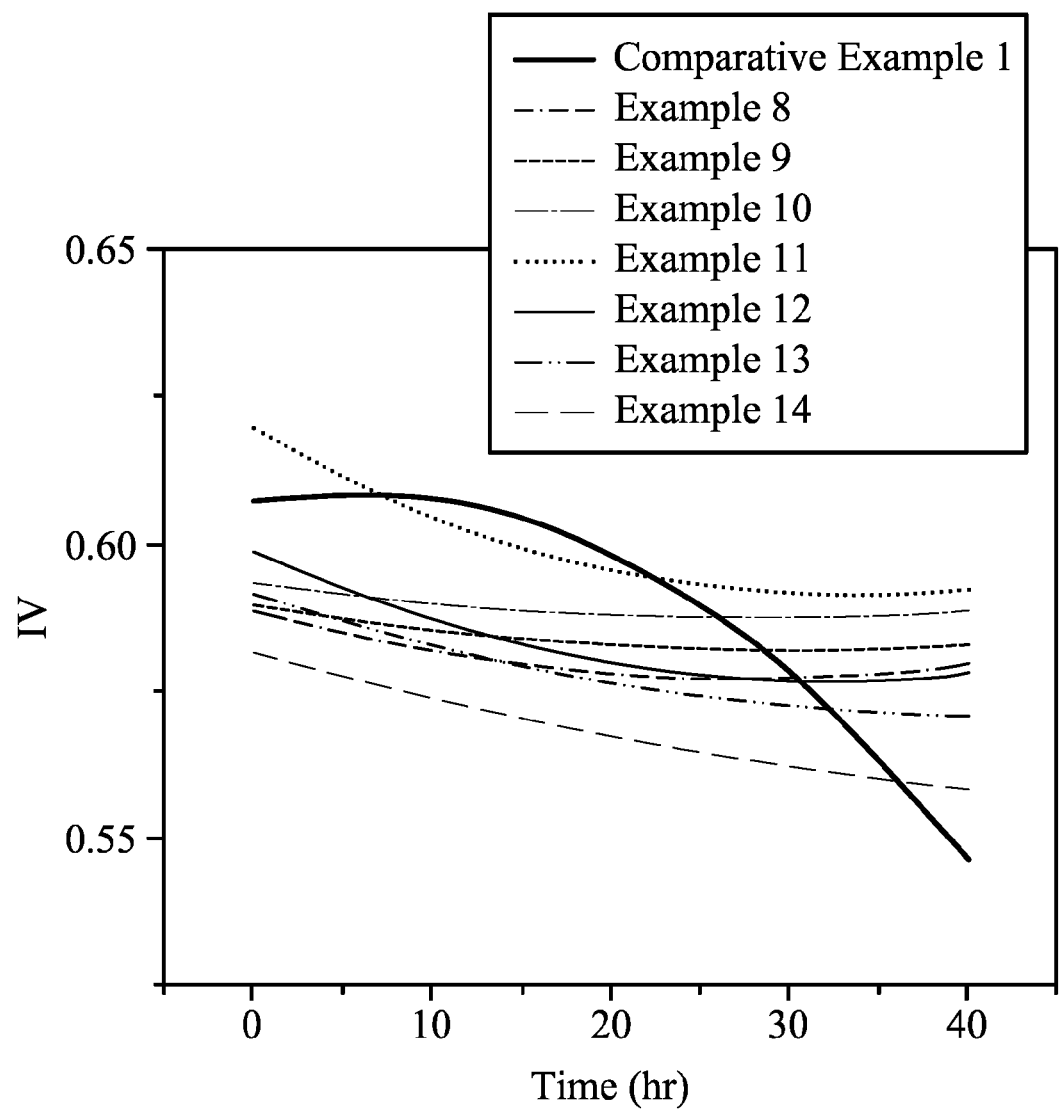
FIG. 2 is a graph plotting the hydrolysis resistances of modified polyester pellets disclosed in Examples 8-14 and Comparative Example 1 of the disclosure.
Figure 3:
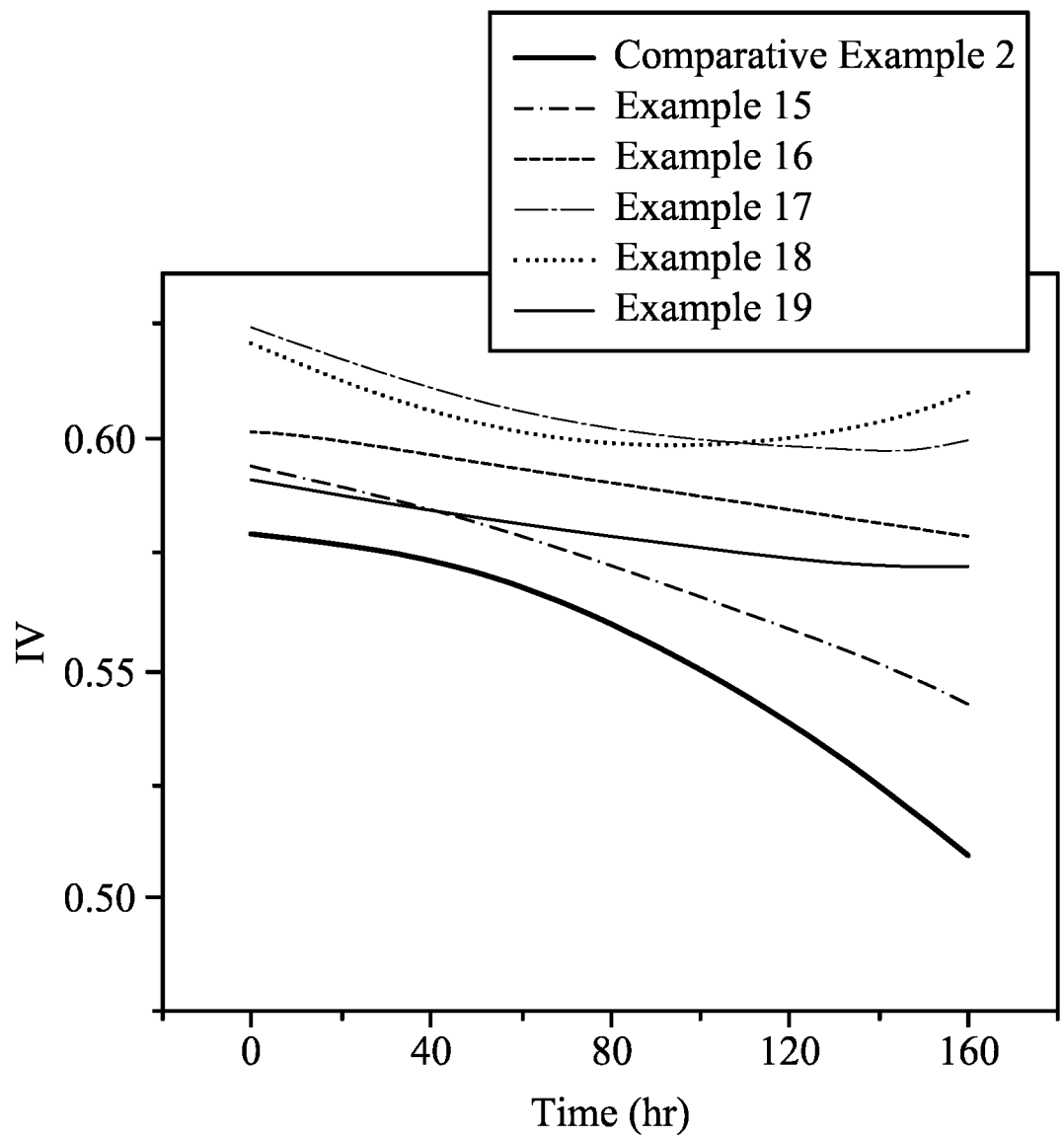
FIG. 3 is a graph plotting the hydrolysis resistances of modified polyester pellets disclosed in Examples 15-19 and Comparative Example 2 of the disclosure.
Figure 4:
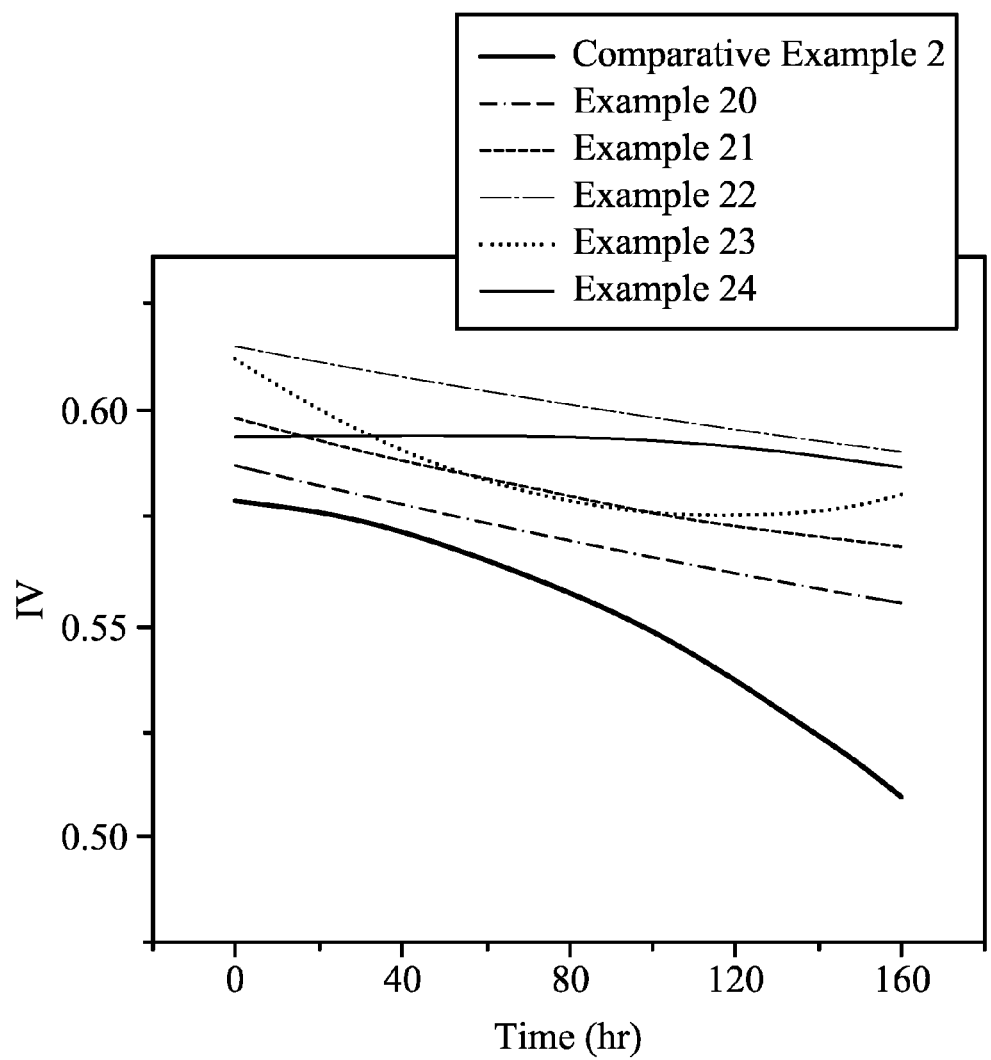
FIG. 4 a graph plotting the hydrolysis resistances of modified polyester pellets disclosed in Examples 20-24 and Comparative Example 2 of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the embodiments of the disclosure, a polyester composition includes a polyester and a branched monomer, wherein the branched monomer has a structure represented by formula (I) or formula (II):

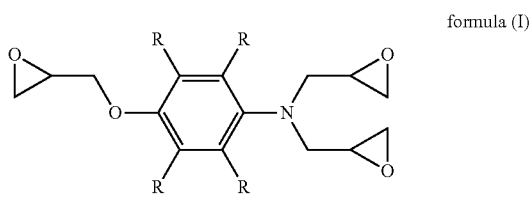

-continued

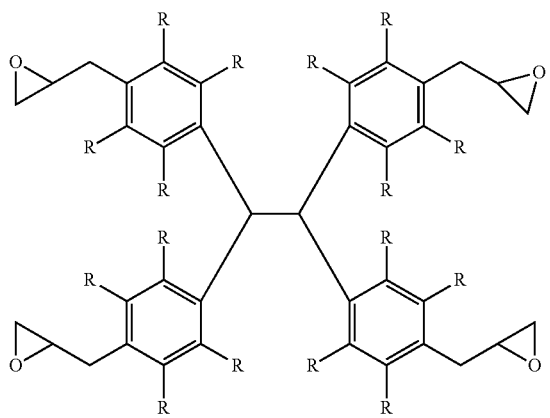

formula (II)

wherein, R is independently hydrogen, fluorine, chlorine, bromine, or $C_{1-6}$ alkyl.

In one embodiment of the disclosure, the polyester composition includes about 80-99.9 parts by weight of the polyester, and about 0.1-20 parts by weight of the branched monomer, wherein the sum of the weight of the polyester and the branched monomer is equal to 100 parts by weight. In another embodiment of the disclosure, the polyester composition includes about 90-99.5 parts by weight of the polyester, and about 0.5-10 parts by weight of the branched monomer, wherein the sum of the weight of the polyester and the branched monomer is equal to 100 parts by weight. In another embodiment of the disclosure, the polyester composition includes about 93-99.5 parts by weight of the polyester, and about 0.5-7 parts by weight of the branched monomer, wherein the sum of the weight of the polyester and the branched monomer is equal to 100 parts by weight. In other embodiments of the disclosure, the polyester composition includes about 95-99.5 parts by weight of the polyester, and about 0.5-5 parts by weight of the branched monomer, wherein the sum of the weight of the polyester and the branched monomer is equal to 100 parts by weight. In one embodiment, an overly low amount of the branched monomer may reduce the hydrolysis resistance of the polyester composition. In one embodiment, an overly high amount of the branched monomer may reduce the heat resistance of the polyester composition. The addition of the branched monomer into the polyester composition may facilitate end-capping the polyester, and decreasing the amount of remained acid groups, resulting in inhibiting the hydrolysis of the polyester. Meanwhile, the migration of the polymer chain of the polyester can be restricted due to the branched monomer, in order to enhance the dimensional stability of the obtained polyester film.

In one embodiment of the disclosure, the polyester can be thermoplastic polyester (e.g. polyethylene terephthalate, polyethylene naphthalate, or polybutylene terephthalate). In another embodiment of the disclosure, the inherent viscosity of the thermoplastic polyester is between about 0.1 ln$\eta$r/C and 0.9 ln$\eta$r/C or between about 0.5 ln$\eta$r/C and 0.7 ln$\eta$r/C.

In one embodiment of the disclosure, the polyester composition can be extruded by a twin screw extruder with a process temperature of between about 280° C. and 330° C., and then the results can be cut into modified polyester pellets. In one embodiment of the disclosure, the modified polyester pellets have an acid number of about 5 eq/$10^6$ g to 20 eq/$10^6$ g, a glass transition temperature (Tg) of about 78° C. to 130° C. (e.g. about 78° C. to 90° C. or about 120° C. to 130° C.), and an inherent viscosity of about 0.1 ln$\eta$r/C to 0.9 ln$\eta$r/C or about 0.5 ln$\eta$r/C to 0.7 ln$\eta$r/C.

In one embodiment of the disclosure, the modified polyester pellets can be further subjected to a melt extrusion process to form a sheet. According to another embodiment of the disclosure, the melt extrusion process can be performed by a continuous extruder (such as a twin screw extruder or a brabender) with a process temperature of between about 200° C. and 350° C. or between about 250° C. and 330° C. and with a spin rate of between about 50 rpm and 300 rpm. The melted modified polyester can be extruded by the T-die, and then solidified by a casting drum to form a sheet having a homogeneously uniform thickness. The casting temperature is usually lower than the Tg of the film to ensure that the polyester being quenched from its melted state. In another embodiment of the disclosure, the thickness of the sheet is between about 100 μm and 500 μm or between about 200 μm and 350 μm. The sheet is then biaxially stretched to form a biaxially oriented polyester film. The sheet is pre-heated at a temperature higher than the Tg of the film, and then simultaneously or sequentially stretched at a specific speed in two directions vertical to each other (machine direction and transverse direction). In other embodiment of the disclosure, the biaxial stretching process can be performed by a biaxial stretching machine with a stretching temperature of between about 60° C. and 100° C. or between about 80° C. and 90° C. The stretching speed is between about 100 mm/min and 800 mm/min or between about 300 mm/min and 500 mm/min. Stretching ratios of between about 1×1 and 9×9 or between about 3×3 and 5×5 may be employed.

In one embodiment of the disclosure, the biaxially oriented polyester film has an acid number of between about 5 eq/$10^6$ g and 20 eq/$10^6$ g, a glass transition temperature (Tg) of between about 100° C. and 130° C., and an inherent viscosity of between about 0.1 ln$\eta$r/C and 0.9 ln$\eta$r/C or between about 0.5 ln$\eta$r/C and 0.7 ln$\eta$r/C. In another embodiment of the disclosure, the hydrolysis resistance time of the biaxially oriented polyester film can be more than about 40 hours. In other embodiment of the disclosure, the hydrolysis resistance time of the biaxially oriented polyester film can be more than about 69 hours.

Below, exemplary embodiments will be described in detail with reference to accompanying drawings so as to be easily realized by a person having ordinary knowledge in the art. The disclosure concept may be embodied in various forms without being limited to the exemplary embodiments set forth herein. Descriptions of well-known parts are omitted for clarity, and like reference numerals refer to like elements throughout.

Manufacture and Properties of Modified Polyester Pellets

EXAMPLE 1

1.5 kg of polyester pellets (having an inherent viscosity (IV) of 0.61) dried under a vacuum at 140° C. for 8 hours, and 7.5 g of branched monomer 1 (0.5 wt %, based on the weight of the polyester pellets) were mixed to obtain a polyester composition, wherein the branched monomer 1 had a structure represented by

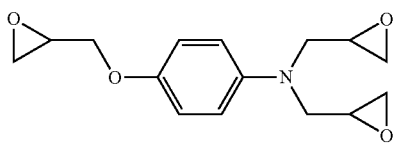 [SMILES: c1cc(N(CC2CO2)CC2CO2)ccc1OCC1CO1]

(manufactured and sold by Chemsphere Technology Inc). The polyester composition was blended and extruded by a twin screw extruder at a temperature of 280° C., and the melt result was extruded into cold water and cut to obtain modified polyester pellets. The physical properties (inherent viscosity (IV), glass transition temperature (Tg), melting point (Tm), and acid number) of the modified polyester pellets were measured and are shown in Table 1. The physical properties of the modified polyester pellets were determined by the following methods:

Inherent viscosity (IV): The modified polyester pellets were dissolved into a co-solvent (phenol/trichloroethylene (TCE)) at 30° C. Next, the inherent viscosity of the solution was measured by viscometer under a slight stirring by means of a stirring motor (115V.50/60CY, 1.2 A, 1550 RPM).

Glass transition temperature (Tg): 5-10 mg of the modified polyester pellets was heated to 800° C. (with a heating rate of 20° C./min), and then measured under a nitrogen atmosphere by thermogravimetry analyzer (TGA).

Melting point (Tm): 5-10 mg of the modified polyester pellets was measured under a nitrogen atmosphere by differential scanning calorimeter (DSC).

Acid number: 1.0 g of the modified polyester pellets was dissolved into 80 ml o-cresol and the solution was heated to 85° C. After cooling to room temperature, 4 ml of mater was added into the solution. Next, the solution was titrated with KOH ethanol solution (0.1N) by a potentiometric Titrator (Metrohm 702 SM) to determine the acid number.

EXAMPLES 2-7

Examples 2-7 were performed in the same manner as Example 1 except that the amount of branched monomer 1 was changed according to table 1. The physical properties (inherent viscosity (IV), glass transition temperature (Tg), melting point (Tm), and acid number) of the modified polyester pellets were measured and are shown in Table 1.

COMPARATIVE EXAMPLE 1

Comparative Example 1 was performed in the same manner as Example 1 except that there was no branched monomer 1 in the polyester composition of comparative example 1. The physical properties (inherent viscosity (IV), glass transition temperature (Tg), melting point (Tm), and acid number) of the polyester pellets were measured and are shown in Table 1.

TABLE 1

| | Amount of branched monomer 1 (wt %) | IV (lnηr/C) | Tg (° C.) | Tm (° C.) | COOH (eq/$10^6$ g) |
|---|---|---|---|---|---|
| Comparative Example 1 | 0 | 0.61 | 77.92 | 254.38 | 59 |
| Example 1 | 0.5 | 0.59 | 84.40 | 250.01 | 15 |
| Example 2 | 1.0 | 0.58 | 83.60 | 249.03 | 15 |
| Example 3 | 1.5 | 0.59 | 84.75 | 249.04 | 13 |
| Example 4 | 2.0 | 0.58 | 82.77 | 249.43 | 10 |
| Example 5 | 3.0 | 0.60 | 83.21 | 250.26 | 11 |

TABLE 1-continued

| | Amount of branched monomer 1 (wt %) | IV (lnηr/C) | Tg (° C.) | Tm (° C.) | COOH (eq/$10^6$ g) |
|---|---|---|---|---|---|
| Example 6 | 5.0 | 0.60 | 82.56 | 249.42 | 10 |
| Example 7 | 7.0 | 0.61 | 80.01 | 236.37 | 10 |

EXAMPLE 8

1.5 kg of polyester pellets (having an inherent viscosity (IV) of 0.61) dried under a vacuum at 140° C. for 8 hours, and 7.5 g of branched monomer 2 (0.5 wt %, based on the weight of the polyester pellets) were mixed to obtain a polyester composition, wherein the branched monomer 2 had a structure represented by

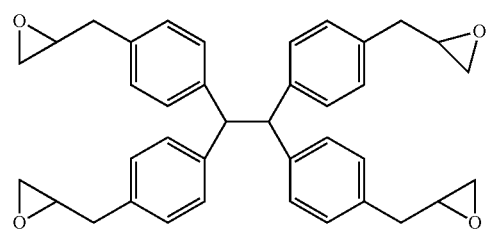 [SMILES: c1cc(C(c2ccc(CC3CO3)cc2)C(c2ccc(CC3CO3)cc2)c2ccc(CC3CO3)cc2)ccc1CC1CO1]

(manufactured and sold by Chemsphere Technology Inc). The polyester composition was blended and extruded by a twin screw extruder at a temperature of 280° C. and the melt result was extruded into cold water and cut to obtain modified polyester pellets. The physical properties (inherent viscosity (IV), glass transition temperature (Tg), melting point (Tm), and acid number) of the modified polyester pellets were measured and are shown in Table 2.

EXAMPLES 9-14

Examples 9-14 were performed in the same manner as Example 8 except that the amount of branched monomer 2 was changed according to table 2. The physical properties (inherent viscosity (IV), glass transition temperature (Tg), melting point (Tm), and acid number) of the modified polyester pellets were measured and are shown in Table 2.

TABLE 2

| | Amount of branched monomer 2 (wt %) | IV (lnηr/C) | Tg (° C.) | Tm (° C.) | COOH (eq/$10^6$ g) |
|---|---|---|---|---|---|
| Comparative Example 1 | 0 | 0.61 | 77.92 | 254.38 | 59 |
| Example 8 | 0.5 | 0.59 | 84.29 | 253.35 | 9 |
| Example 9 | 1.0 | 0.59 | 82.62 | 254.89 | 10 |
| Example 10 | 1.5 | 0.60 | 82.42 | 253.77 | 9 |
| Example 11 | 2.0 | 0.62 | 81.59 | 253.35 | 7 |
| Example 12 | 3.0 | 0.60 | 82.23 | 254.27 | 8 |
| Example 13 | 5.0 | 0.59 | 83.15 | 253.94 | 9 |
| Example 14 | 7.0 | 0.58 | 79.36 | 239.64 | 10 |

As shown in Tables 1 and 2, the acid number of the modified polyester pellets is reduced as the amount of the branched monomer is increased. In Examples 8-14, the acid number of the modified polyester pellets is reduced below about 10 eq/$10^6$ g. As the results of Examples 1-14 and Comparative Example 1, the glass transition temperature of the modified polyester pellets is increased and the acid number of the modified polyester pellets is reduced with the addition of the branched monomer.

EXAMPLE 15

1.5 kg of polyethylene naphthalate pellets (having an inherent viscosity (IV) of 0.59) dried under a vacuum at 140° C. for 8 hours, and 7.5 g of branched monomer 1 (0.5 wt %, based on the weight of the polyester pellets) were mixed to obtain a polyester composition, wherein the branched monomer 1 had a structure represented by

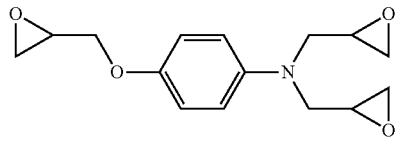 [SMILES: c1cc(N(CC2CO2)CC2CO2)ccc1OCC1CO1]

(manufactured and sold by Chemsphere Technology Inc). The polyester composition was blended and extruded by a twin screw extruder at a temperature of 300° C. and the melt result was extruded into cold water and cut to obtain modified polyester pellets. The physical properties (inherent viscosity (IV), glass transition temperature (Tg), and melting point (Tm)) of the modified polyester pellets were measured and are shown in Table 3.

EXAMPLE 16-19

Examples 16-19 were performed in the same manner as Example 15 except that the amount of branched monomer 1 was changed according to table 3. The physical properties (inherent viscosity (IV), glass transition temperature (Tg), and melting point (Tm)) of the modified polyester pellets were measured and are shown in Table 3.

COMPARATIVE EXAMPLE 2

Comparative Example 2 was performed in the same manner as Example 15 except that there was no branched monomer 1 in the polyester composition of Comparative Example 2. The physical properties (inherent viscosity (IV), glass transition temperature (Tg), and melting point (Tm)) of the polyester pellets were measured and are shown in Table 3.

TABLE 3

|  | Amount of branched monomer 1 | IV (lnηr/C) | Tg (° C.) | Tm (° C.) |
| --- | --- | --- | --- | --- |
| Comparative Example 2 | 0 | 0.58 | 118.72 | 261.47 |
| Example 15 | 0.5 | 0.59 | 120.09 | 261.32 |
| Example 16 | 1.0 | 0.60 | 123.74 | 257.68 |
| Example 17 | 1.5 | 0.62 | 124.01 | 256.59 |
| Example 18 | 2.0 | 0.62 | 121.97 | 254.77 |
| Example 19 | 5.0 | 0.59 | 120.01 | 241.59 |

EXAMPLE 20

1.5 kg of polyethylene naphthalate pellets (having an inherent viscosity (IV) of 0.59) dried under a vacuum at 140° C. for 8 hours, and 7.5 g of branched monomer 2 (0.5 wt %, based on the weight of the polyester pellets) were mixed to obtain a polyester composition, wherein the branched monomer 2 had a structure represented by

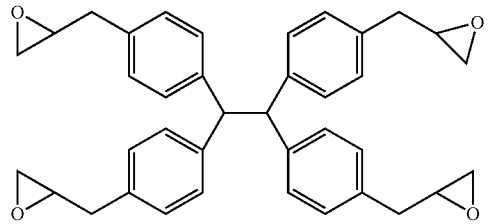 [SMILES: c1cc(C(c2ccc(CC3CO3)cc2)C(c2ccc(CC3CO3)cc2)c2ccc(CC3CO3)cc2)ccc1CC1CO1]

(manufactured and sold by Chemsphere Technology Inc). The polyester composition was blended and extruded by a twin screw extruder at a temperature of 300° C. and the melt result was extruded into cold water and cut to obtain modified polyester pellets. The physical properties (inherent viscosity (IV), glass transition temperature (Tg), and melting point (Tm)) of the modified polyester pellets were measured and are shown in Table 4.

EXAMPLES 21-24

Examples 21-24 were performed in the same manner as Example 20 except that the amount of branched monomer 2 was changed according to table 4. The physical properties (inherent viscosity (IV), glass transition temperature (Tg), and melting point (Tm)) of the modified polyester pellets were measured and are shown in Table 4.

TABLE 4

|  | Amount of branched monomer 2 (wt %) | IV (lnηr/C) | Tg (° C.) | Tm (° C.) |
| --- | --- | --- | --- | --- |
| Comparative example 2 | 0 | 0.58 | 118.72 | 261.47 |
| example 20 | 0.5 | 0.58 | 120.02 | 260.98 |
| example 21 | 1.0 | 0.59 | 122.37 | 257.42 |
| example 22 | 1.5 | 0.61 | 124.89 | 255.98 |
| example 23 | 2.0 | 0.60 | 123.43 | 253.89 |
| example 24 | 5.0 | 0.60 | 117.56 | 238.78 |

As shown in Table 3 and 4, the glass transition temperature of the modified polyester pellets is increased with the addition of the branched monomer.

Hydrolysis Resistance Test of the Modified Polyester Pellets

The modified polyester pellets of Examples 1-14 were subject to a hydrolysis resistance test (bathing at 100° C. water for 40 hr), and the inherent viscosities of the modified polyester pellets of Examples 1-14 were measured during the hydrolysis resistance test. The results were shown in FIG. 1 and FIG. 2. On the other hand, The modified polyester pellets of Examples 15-24 were subject to a hydrolysis resistance test (bathing at 100° C. water for 160 hr), and the inherent viscosities of the modified polyester pellets of Examples 15-24 were measured during the hydrolysis resistance test. The results were shown in FIG. 3 and FIG. 4. As shown in FIGS. 1-4, the addition of branched monomer into the composition can promote the hydrolysis resistance of the modified polyester pellets.

Manufacture and Properties of Biaxially Oriented Polyester Films

EXAMPLE 25

The modified polyester pellets of Example 1 were dried under a vacuum at 140° C. for 8 hr, and then melted and extruded by a continuous extruder (with a trade number of CF320401803 1/2 HP) to form a sheet with a thickness of about 270 μm. Thereafter, the sheet, pre-heated for about 5 minute, was biaxially stretched at a stretching temperature of 85-90° C. with a stretching speed of 300-500 mm/min and a stretching ratio of 3×3-4×4 to form a film. Subsequently, the film was heat set at a temperature of 200-230° C. to form a biaxially oriented polyester film. The physical properties (such as inherent viscosity (IV), glass transition temperature (Tg), coefficient of thermal expansion (CIE), and thermal shrinkage (at 150° C. for 30 min)) and the average thickness of the biaxially oriented polyester film were measured and are shown in Table 5. The CTE and thermal shrinkage of the biaxially oriented polyester film were determined by the following methods:

Coefficient of thermal expansion: The dimensional variation of the biaxially oriented polyester film was measured by thermal mechanical analyzer (TMA).

Thermal shrinkage (at 150° C. for 30 min): The biaxially oriented polyester film (30*30 cm) was disposed in an oven at 150° C. for 30 min, and then the dimensional variation of the biaxially oriented polyester film was measured.

EXAMPLES 26-30

Examples 26-30 were performed in the same manner as Example 25 except that the modified polyester pellets were changed according to table 5. The physical properties (inherent viscosity (IV), glass transition temperature (Tg), coefficient of thermal expansion (CTE), and thermal shrinkage (150° C., 30 min)) and the average thickness of the biaxially oriented polyester film were measured and are shown in Table 5.

COMPARATIVE EXAMPLE 3

Comparative example 3 was performed in the same manner as Example 25 except that the modified polyester pellets were changed according to table 5. The physical properties (inherent viscosity (IV), glass transition temperature (Tg), coefficient of thermal expansion (CTE), and thermal shrinkage (150° C., 30 min)) and the average thickness of the biaxially oriented polyester film were measured and are shown in Table 5.

EXAMPLE 31

The modified polyester pellets of Example 8 were dried under a vacuum at 140° C. for 8 hr, and then melted and extruded by a continuous extruder to form a sheet with a thickness of about 270 μm. Thereafter, the sheet, pre-heated for about 5 minute, was biaxially stretched at a stretching temperature of 85-90° C. with a stretching speed of 300-500 mm/min and a stretching ratio of 3×3-4×4 to form a film. Subsequently, the film was heat set at a temperature of 200-230° C. to form a biaxially oriented polyester film. The physical properties (such as inherent viscosity (IV), glass transition temperature (Tg), coefficient of thermal expansion (CTE), and thermal shrinkage (at 150° C. for 30 min)) and the average thickness of the biaxially oriented polyester film were measured and are shown in Table 6.

EXAMPLES 32-36

Examples 32-36 were performed in the same manner as Example 31 except that the modified polyester pellets were changed according to table 6. The physical properties (thermal shrinkage (150° C., 30 min)) and the average thickness of the biaxially oriented polyester film were measured and are shown in Table 6.

TABLE 6

| | modified polyester pellets | thermal shrinkage (150° C., 30 min) (MD/TD) | thickness |
|---|---|---|---|
| Comparative Example 3 | Comparative Example 1 | 2.5/1.8 | 30 ± 2 μm |
| Example 31 | Example 8 | 2.0/1.3 | 30 ± 2 μm |
| Example 32 | Example 9 | 1.8/1.2 | 30 ± 2 μm |
| Example 33 | Example 10 | 1.5/0.9 | 30 ± 2 μm |
| Example 34 | Example 11 | 1.2/0.9 | 30 ± 2 μm |
| Example 35 | Example 12 | 1.4/0.7 | 30 ± 2 μm |
| Example 36 | Example 13 | 1.3/0.6 | 30 ± 2 μm |

As shown in Tables 5 and 6, the thermal shrinkage of the biaxially oriented polyester film is reduced with the addition of the branched monomer.

Thermal Mechanical Analysis of the Biaxially Oriented Polyester Films

The biaxially oriented polyester films of Comparative Example 3, Examples 25-27, and Examples 29-30 were mea-

TABLE 5

Figure 5:
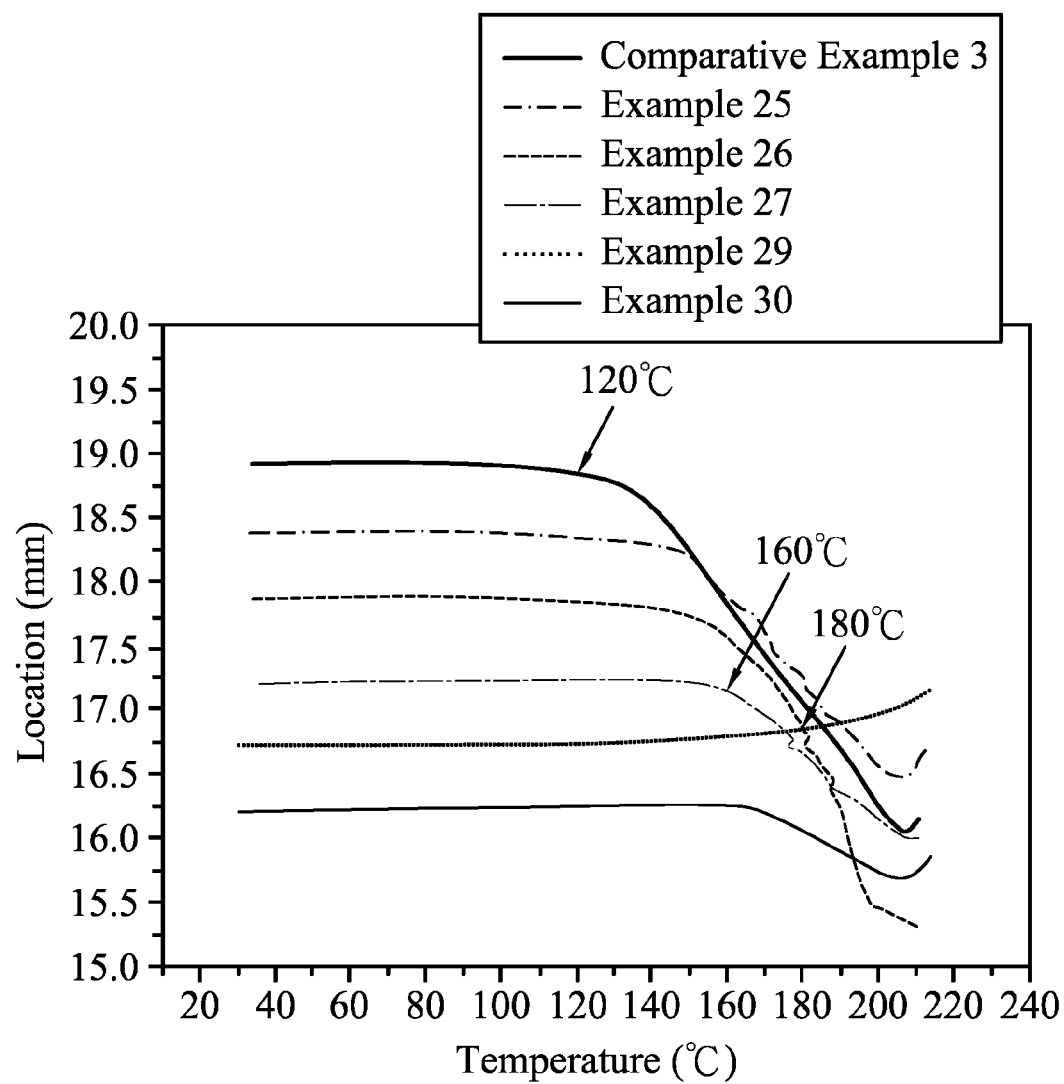
FIG. 5 is a graph plotting the results of biaxially oriented polyester films disclosed in Examples 25-27 and 29-30 and Comparative Example 3 of the disclosure measured by a thermal mechanical analyzer.

| | modified polyester pellets | IV (lnηr/C.) | Tg (° C.) | CTE (ppm/° C.) | Thermal shrinkage (150° C., 30 min) (MD/TD) | thickness |
|---|---|---|---|---|---|---|
| Comparative Example 3 | Comparative Example 1 | 0.57 | 110.23 | 55.04 | 2.5/1.8 | 30 ± 2 μm |
| Example 25 | Example 1 | 0.58 | 122.55 | 20.49 | 1.9/1.3 | 30 ± 2 μm |
| Example 26 | Example 2 | 0.58 | 121.76 | 17.98 | 1.8/1.0 | 30 ± 2 μm |
| Example 27 | Example 3 | 0.59 | 124.21 | 16.10 | 1.5/0.9 | 30 ± 2 μm |
| Example 28 | Example 4 | 0.59 | 123.35 | 15.90 | 1.4/0.8 | 30 ± 2 μm |
| Example 29 | Example 5 | 0.58 | 122.88 | 15.12 | 1.5/0.8 | 30 ± 2 μm |
| Example 30 | Example 6 | 0.60 | 124.57 | 14.98 | 1.4/0.6 | 30 ± 2 μm | sured by a thermal mechanical analyzer (TMA) within a temperature range between 30-220° C.), and the results are shown in FIG. 5. The biaxially oriented polyester film of Comparative Example 3 was out of shape at 120° C. On the other hand, the biaxially oriented polyester film of Example 29 was out of shape at 180° C. As shown in FIG. 5, the thermal resistance of the biaxially oriented polyester film can be improved with the addition of the branched monomer.

Dimensional Stability Test of the Biaxially Oriented Polyester Films

Figure 6:
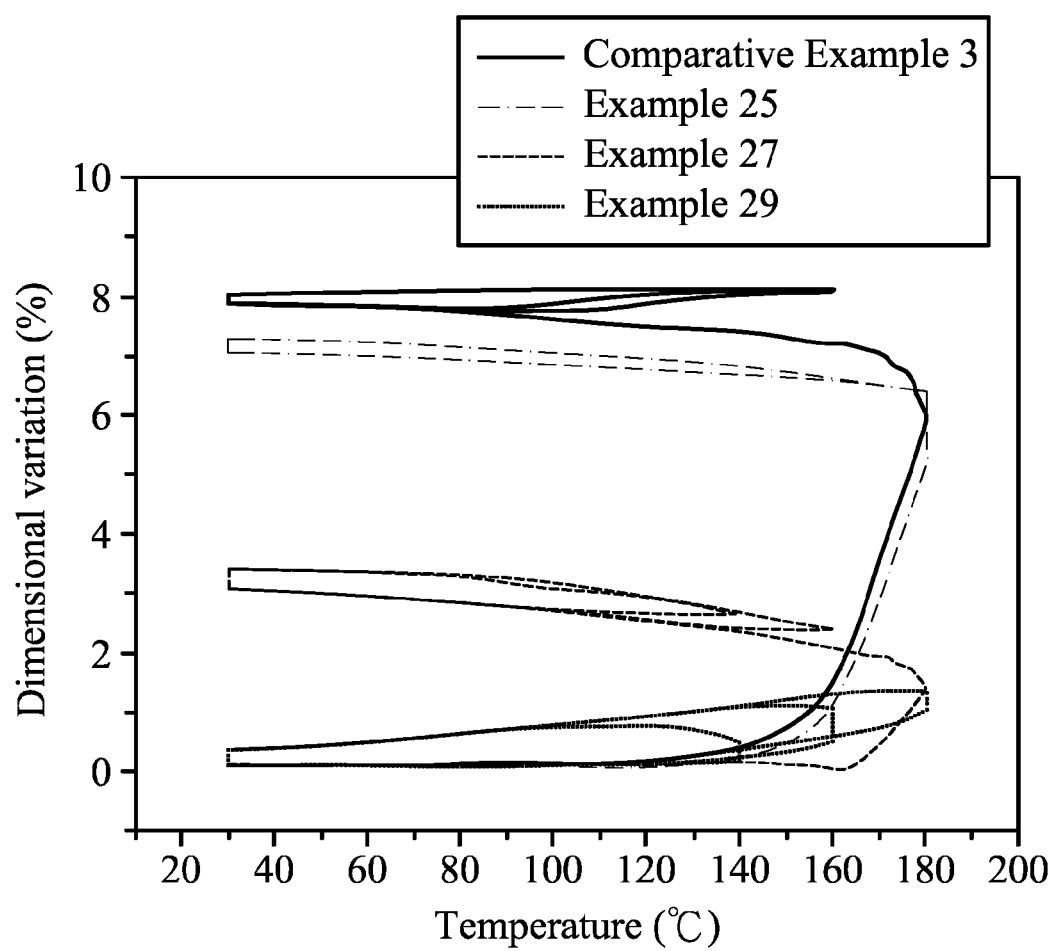
FIG. 6 is a graph plotting the dimensional stabilities of biaxially oriented polyester films disclosed in Examples 25, 27 and 29 and Comparative Example 3 of the disclosure.

The biaxially oriented polyester films of Comparative Example 3, Example 25, Example 27, and Example 29 were subjected to dimensional stability tests (heating to 180° C. and cooling to 30° C. for 3 times repeatedly with a heating rate of 10° C./min and a cooling rate 40/min), and the results are shown in FIG. 6. As shown in FIG. 6, the dimensional stability of the biaxially oriented polyester film can be improved with the addition the branched monomer.

Hydrolysis Resistance Test of the Biaxially Oriented Polyester Films

Figure 7:
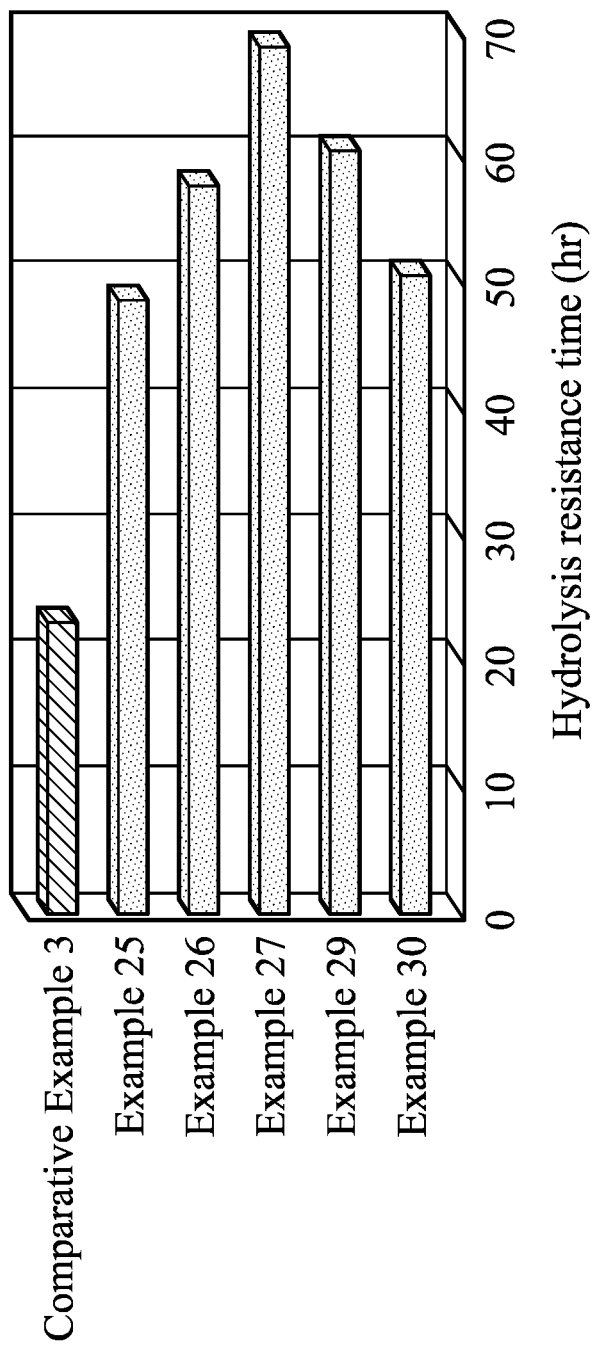
FIG. 7 is a graph plotting the hydrolysis resistances of biaxially oriented polyester films disclosed in Examples 25-27 and 29-30 and Comparative Example 3 of the disclosure.

The biaxially oriented polyester films of Comparative Example 3, Examples 25-27, and Examples 29-30 were subjected to hydrolysis resistance test. The hydrolysis resistance test included boiling the film in water at 121° C. under 100% RH, and subjecting the film to a tensile testing process according to ASTM D882. The results were shown in FIG. 7. The hydrolysis resistance time of Examples 25-27, and Examples 29-30 is more than 40 hr. In particular, the hydrolysis resistance time of Example 27 is more than about 69 hr. Namely, the film of Example 27 has a film elongation of more than 50% after a 69-hour degradation test). As shown in FIG. 7, the hydrolysis resistance time of the biaxially oriented polyester film is improved with the addition of the branched monomer.

It will be apparent to those skilled in the art that various modifications and variations can be made to the disclosed methods and materials. It is intended that the specification and examples be considered as exemplary only, with a true scope of the disclosure being indicated by the following claims and their equivalents.

What is claimed is:

1. A polyester composition, comprising:
   a polyester; and
   a branched monomer, wherein the branched monomer has a structure represented by formula (I) or formula (II):

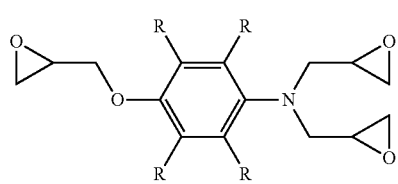

formula (I)

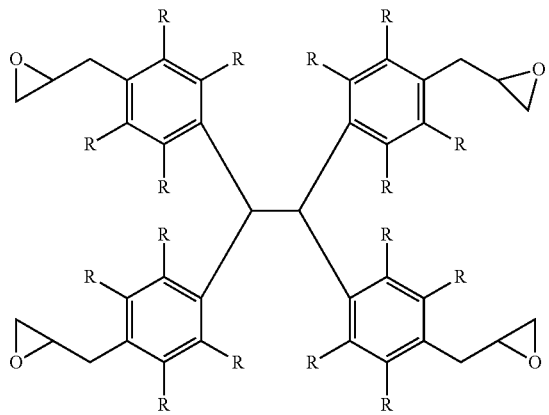

formula (II)

wherein, R is independently hydrogen, fluorine, chlorine, bromine, or $C_{1-6}$ alkyl, and wherein the polyester composition comprises 80-99.9 parts by weight of polyester, and 0.1-20 parts by weight of branched monomer, wherein a sum of the weight of the polyester and the branched monomer is equal to 100 parts by weight.

2. The polyester composition as claimed in claim 1, wherein the polyester comprises a thermoplastic polyester.

3. The polyester composition as claimed in claim 2, wherein the thermoplastic polyester comprises a polyethylene terephthalate, a polyethylene naphthalate, or polybutylene terephthalate.

4. A polyester article, comprising:
   a product made by polymerizing the composition as claimed in claim 1.

5. The polyester article as claimed in claim 4, wherein the polyester article has an acid number of between 5 eq/$10^6$ g and 20 eq/$10^6$ g.

6. The polyester article as claimed in claim 4, wherein the polyester article has an inherent viscosity of between 0.1 lmηr/C and 0.9 lmηr/C.

7. The polyester article as claimed in claim 4, wherein the polyester article is a film, and the hydrolysis resistance of the film is more than 40 hours.

8. The polyester composition as claimed in claim 1, wherein the polyester composition comprises 90-99.5 parts by weight of polyester, and 0.5-10 parts by weight of branched monomer, wherein the sum of weight of the polyester and the branched monomer is equal to 100 parts by weight.

9. The polyester composition as claimed in claim 1, wherein the polyester composition comprises 93-99.5 parts by weight of polyester, and 0.5-7 parts by weight of branched monomer, wherein the sum of the weight of the polyester and the branched monomer is equal to 100 parts by weight.

10. The polyester composition as claimed in claim 1, wherein the polyester composition comprises 95-99.5 parts by weight of polyester, and 0.05-5 parts by weight of branched monomer, wherein the sum of the weight of the polyester and the branched monomer is equal to 100 parts by weight.

11. The polyester composition as claimed is claim 1, wherein said composition consists essentially of said polyester and said branched monomer.

12. A polyester composition, comprising:
a polyester; and
a branched monomer, wherein the branched monomer has a structure represented by formula (II):
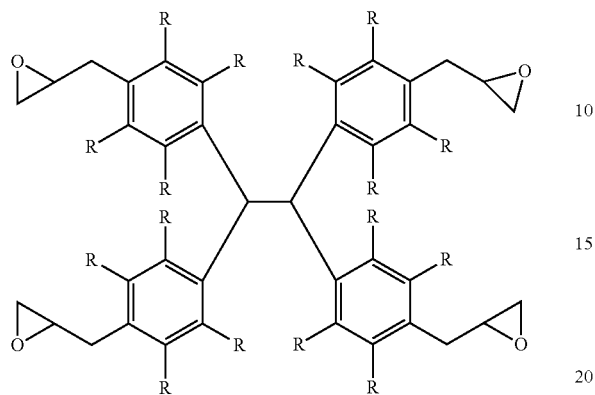
formula (II)
wherein, R is independently hydrogen, fluorine, chlorine, bromine, or $C_{1-6}$alkyl.
* * * * *